No. 884,899. PATENTED APR. 14, 1908.
J. S. COVENTRY.
SIFTER SIEVE.
APPLICATION FILED AUG. 31, 1907.
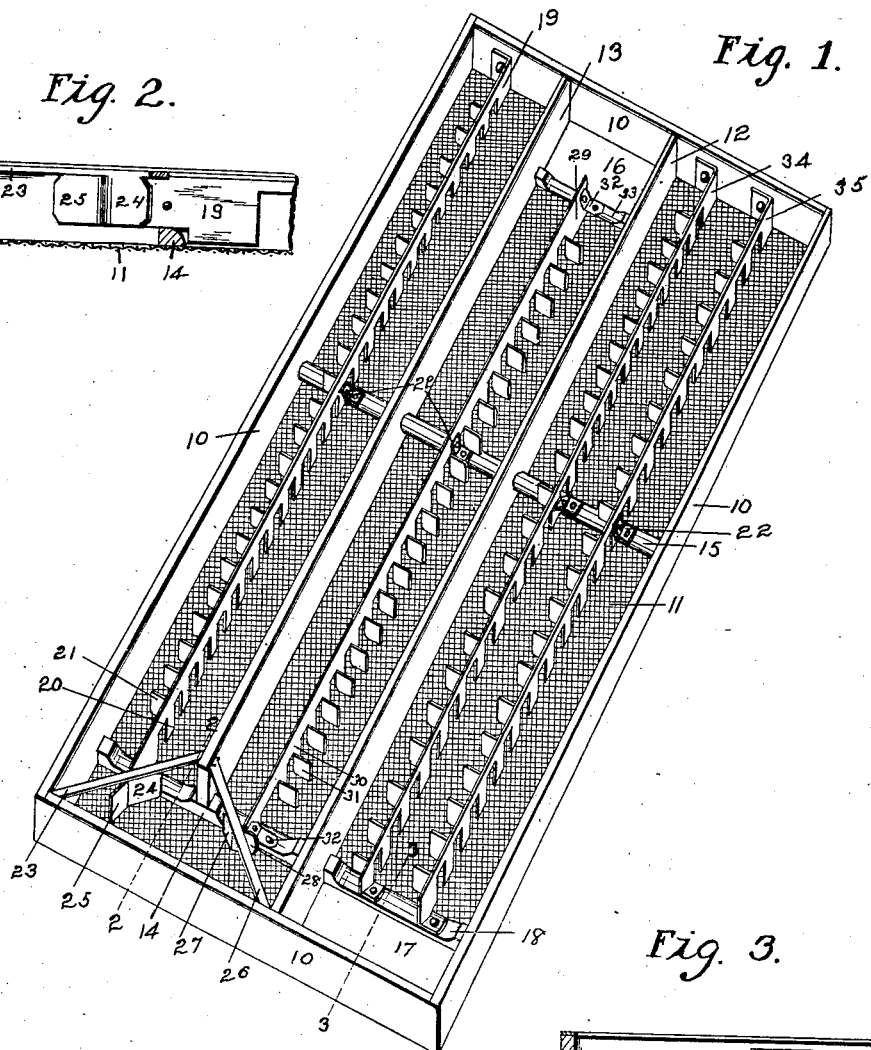
Witnesses.
F. C. Dahlberg.
R. H. Decker.
Inventor.
J. S. Coventry.
by Orwig & Lane attys

UNITED STATES PATENT OFFICE.

JOHN S. COVENTRY, OF DES MOINES, IOWA.

SIFTER-SIEVE.

No. 884,899.　　　Specification of Letters Patent.　　　Patented April 14, 1908.

Application filed August 31, 1907. Serial No. 390,891.

*To all whom it may concern:*

Be it known that I, JOHN S. COVENTRY, a citizen of the United States, residing at Des Moines, in the county of Polk and State of Iowa, have invented a certain new and useful Sifter-Sieve, of which the following is a specification.

My invention relates to that class of sifter sieves which are placed in a horizontal position and given a gyroscopic motion.

My object is to provide a sieve of this kind with means for advancing stock over the sieve, and also for turning the stock over upon the sieve so that all parts of the stock will at times be brought into direct contact with the sieve so that the finer particles may all pass through the sieve and the coarser particles be conveyed to a point of discharge, to thereby materially increase the separating quality of a sieve of given size.

My invention consists in the construction, arrangement and combination with a sieve, of flights of blades so arranged and disposed as to rapidly advance stock over the sieve and also turn it over, whereby the objects contemplated are attained, as hereinafter more fully set forth, pointed out in my claims and illustrated in the accompanying drawings, in which—

Figure 1 shows a perspective view of a sieve embodying my invention. Fig. 2 shows a sectional view on the line 2—2 of Fig. 1, and Fig. 3 shows a sectional view on the line 3—3 of Fig. 1.

Referring to the accompanying drawings, I have used the reference numeral 10 to indicate the sieve frame, having stretched across its bottom a sieve 11, which may be made of bolting cloth or other sieve material. Within the frame 10 is a longitudinal partition 12, dividing the sieve into two parts, each of which is designed to receive a different kind or quality of stock, and to treat the stock separately and independently. Between the partition 12 and the left side of the frame, is a second longitudinal partition 13 extending from one end of the frame to a point spaced apart from the other end. This partition 13 is supported at the end that is spaced apart from the frame by means of a cross brace 14, with its ends attached to one side of the sieve frame 10, and to the partition 12 above the sieve 11. I have also provided a cross brace 15 at about the center of the sieve frame, for supporting the central portions of both the partitions 12 and 13. I have provided a discharge opening 16 adjacent to the ends of the partitions 12 and 13, opposite from the cross brace 14, and I have also provided a discharge opening 17 at the end of the sieve between the partition 12 and the adjacent side of the frame 10. A cross brace 18 is provided adjacent to said opening.

For the purpose of advancing stock between the partition 13 and the adjacent side of the frame 10, I have provided a straight bar 19 having one end attached to the end of the frame 10, and its other end attached to the cross brace 14. This bar is supported mid-way between the partition 13 and the adjacent side of the frame 10. Projecting downwardly from the bar 15 is a series of flat blades 20 with spaces between them of substantially the same size as the blades. The lower edges of said blades extend to a point slightly spaced apart from the sieve.

On each of the blades 20 I have formed a blade 21 extended at right angles to the bar 19 toward the adjacent side of the frame 10. These blades 20 may, if desired, be formed from the material that is cut away between the blades 20. The entire bar 19 and its blades may all be formed from a single piece of flat metal, the blades 21 of which are formed by cutting away two sides of each blade from the bar 19, and bending same to the position shown in the drawings.

It is essential to the successful operation of my invention that the blades comprise a part 20 substantially in line with the supporting bar 19, and a part 21 substantially at right angles thereto so that each pair of blades forms a pocket having two sides substantially at right angles to each other, which co-act with each other in engaging stock on the sieve, and which will engage a quantity of stock and advance it toward the adjacent side of the sieve frame when a gyrating motion is imparted to the sieve frame. The central portion of this bar is supported by a bracket 22 resting on the cross brace 15. For operating on the stock at the end of the bar 19, I have provided a supporting bar 23 attached at one end to the end of the partition 13, and extended outwardly to the adjacent corner of the frame 10, and on this bar 23 is a downwardly projecting blade 24 parallel with the bar, and a blade 25 arranged at an obtuse angle relative to the blade 24. A similar supporting bar 26, with two blades 27 and 28, is connected at one end to the partition 13, and to the end of the frame 10 adjacent to the partition 12. In the space between the partitions 12 and 13, I have provided a bar 29 having blades 30 and 31, similar to the bar 19. This bar is supported by brackets 32 upon the cross braces 14, 22, and a cross brace 33, between the partitions 12 and 13. In the space between the partition 12 and the adjacent side of the frame 10 I have provided two bars 34 and 35, having blades thereon similar to the blades on the bar 19. These bars 34 and 35 are spaced apart from each other and from the adjacent sides of the compartment in which they are placed.

In practical use, and assuming that the sieve is placed in a horizontal position, and that a rapid gyrating motion is imparted to it, and also that stock to be sifted is being fed to the compartment between the partition 13 and the adjacent side of the frame 10, each pair of blades comprising a member 20 and a member 21, forms a pocket, the sides of which will engage stock upon the sieve, and throw it diagonally toward the side of the sieve frame with sufficient force to cause it to rebound and come back toward the bar 19, and have some of it pass over the bar and drop to the sieve on the opposite side of the bar. I have discovered that in order for the blades to properly advance stock over the sieve, they must be formed in pockets with two sides at or near right angles to each other, as a single straight blade, no matter at what angle it may be placed relative to the bar, will simply throw material in all directions from it for a slight distance, but will not be sufficient to throw material toward the adjacent side of the sieve frame with sufficient force to cause the material to rebound and pass back over the blades. However, by having the blades arranged as shown, they will all coöperate in moving the stock toward one end of the sieve, and they will also throw the stock over the bar and permit it to drop on top of the sieve, and then pass through the openings between the blades that are in line with the sieve. In this way, the stock is turned completely over and portions of it that were not formerly in direct contact with the sieve are then brought into direct contact with it. As the movement of the sieve continues, this stock will be again thrown toward the bar 19 and will pass through between and under the blades 20 thereon, and the same operation be continued.

In a sieve of this kind, there is a tendency for the stock to accumulate at the center of the sieve between the partitions, but by means of my improved stock advancing and turning device, the stock will be evenly distributed throughout the entire surface of the sieve so that the sieve may operate at its maximum efficiency at all times. The function of the blades 24 and 25 is to deflect the stock that accumulates adjacent to it, and throw it laterally across the end of the sieve, and the function of the blades 27 and 28 is to throw the stock toward the bar 29. Between the partition 12 and the adjacent side of the sieve frame, I have shown two stock advancing and turning devices, and I have found that in some instances very desirable results are obtained in this way, as these bars both operate to advance the stock from one end to the other of the sieve, and to turn it over and keep the stock from accumulating at the center of the sieve. It is to be understood in this connection that the motion imparted to the sieve is sufficient to throw the stock from side to side of the sieve frame, and upwardly, and sieves of this kind are intended to be used in connection with a top cover over the sieve frame, to prevent the stock from moving over the partitions, or over the sides of the frame.

One of the advantages in arranging the bars mid-way between the sides of the sieve or between a solid partition and the adjacent side of the sieve, is that material may be thrown over the top of the bar and strike upon the sieve. When this action takes place, the sieve is vibrated up and down by means of this falling material to such an extent that the sieve is made self-cleaning. Obviously, this result could not be obtained in devices having the blades fixed to a solid partition, or a side of the sieve, for in such cases, the blades could only operate to move the material from one side of the sieve to the other, in which case the material would not be turned over and the sieve would not be vibrated up and down, and hence, it would be necessary to provide some means such as brushes or the like for cleaning the sieve.

Having thus described my invention, what I claim and desire to secure by Letters Patent of the United States, therefor, is—

1. In a device of the class described, the combination with a sieve frame and a sieve thereon, of a bar supported by the sieve frame above the sieve, with its top arranged below the top of the sieve frame, and a series of blades connected with the said bar, each blade being shaped to form a pocket having sides arranged at substantially right angles to each other, said blades also being spaced apart from each other to permit material to freely pass through them under the bar.

2. In a device of the class described, the combination of a sieve frame having a sieve thereon, a bar supported above the sieve, spaced apart from the sides of the sieve frame, and also arranged below the top of the sieve frame, and a series of blades attached to the bar, each blade comprising a part extended substantially at right angles to the bar, and a part substantially in line with the bar, said bar formed with spaces between the blades adjacent to the sieve.

3. In a device of the class described, the combination of a sieve frame, and a sieve thereon, said sieve being formed with a discharge opening near one end, a partition in the sieve frame above the sieve, extending from a point adjacent to the discharge opening to a point near the opposite end of the sieve to thereby form a continuous chamber extending along both sides of the partition, and around one end of it, to the discharge opening, stock advancing bars arranged in the spaces between the partition and the adjacent sides of the sieve frame, each stock advancing bar having thereon a series of blades, the parts of each blade being arranged substantially at right angles to each other, and a stock deflecting and advancing device arranged at the end of the bar adjacent to the point where the partition is spaced from the end of the frame for the purposes stated.

Des Moines, Iowa, Aug. 9, 1907.

JOHN S. COVENTRY.

Witnesses:
  S. F. CHRISTY,
  RALPH ORWIG.